United States Patent [19]

Fujikawa et al.

[11] Patent Number: 5,537,537
[45] Date of Patent: Jul. 16, 1996

[54] BURN-IN DIAGNOSTIC TECHNIQUE FOR A DISC DRIVING APPARATUS

[75] Inventors: Daisuke Fujikawa; Takenori Sonoda; Kenichi Sakai, all of Kanagawa, Japan

[73] Assignee: Sony Corporation, Tokyo, Japan

[21] Appl. No.: 507,780

[22] Filed: Jul. 26, 1995

Related U.S. Application Data

[63] Continuation of Ser. No. 635,225, Dec. 28, 1990, abandoned.

[30] Foreign Application Priority Data

Jan. 12, 1990 [JP] Japan .................................... 2-005322

[51] Int. Cl.⁶ .................................................. G06F 11/34
[52] U.S. Cl. ..................... 395/183.06; 365/201
[58] Field of Search ................... 395/183.06, 183.01, 395/183.07; 358/335; 360/31; 371/22.1; 324/73, 158 R; 365/201

[56] References Cited

U.S. PATENT DOCUMENTS

| | | | |
|---|---|---|---|
| 3,717,846 | 2/1973 | Kanda et al. | 340/146.1 F |
| 4,103,338 | 7/1978 | Cizmic et al. | 364/900 |
| 4,326,290 | 4/1982 | Davis et al. | 371/21.1 |
| 4,380,805 | 4/1983 | Proebsting | 365/201 |
| 4,689,791 | 8/1987 | Ciuciu et al. | 371/27 |
| 4,866,714 | 9/1989 | Adams et al. | 371/22.1 |
| 4,871,963 | 10/1989 | Cozzi | 324/73 R |
| 5,068,851 | 11/1991 | Bruckert et al. | 371/16.1 |
| 5,157,781 | 10/1992 | Hardwood et al. | 395/575 |

Primary Examiner—Hoa T. Nguyen
Attorney, Agent, or Firm—Ronald P. Kananen

[57] ABSTRACT

A hard disc drive includes a self-diagnostic program which is stored either in ROM, on the magnetic disc or the like. This program enables the disc drive to be placed in an environment wherein a predetermined temperature is maintained and a so called "burn in" diagnostic carried out without the need for host computers and interface cabling. The outcome of the diagnostic can be recorded on a suitable media within the drive for later accessing.

11 Claims, 4 Drawing Sheets

BURN-IN DIAGNOSTIC TECHNIQUE FOR A DISC DRIVING APPARATUS

This application is a continuation of application Ser. No. 07/635,225 filed Dec. 28, 1990, abandoned.

BACKGROUND OF THE INVENTION

Field of the Invention

This invention relates to a disc recording/reproducing apparatus and, more particularly, to a burn-in diagnostic technique for disc recording/reproducing apparatus.

In order to screen apparatus which are possibly suffering from time-and stress-related troubles, it is known to put, the apparatus through a test known as a burn-in, wherein the apparatus is subjected to a predetermined temperature during the production process.

In executing the burn-in for the disc recording/reproducing apparatus, the apparatus is placed in a burn-in chamber, which is a constant temperature tank, and is connected to a host computer by an interfacing cabling. A test, program is down-line loaded from the host computer to the disc recording/reproducing apparatus under control of the host computer, and is run under instructions issued from the host computer.

The results obtained through the execution of the test program are collected by the host computer for determining if the disc recording/reproducing apparatus is or is not in a normal operating state. This diagnostic system is referred to as the on-line checking system.

When implementing such an on-line checking system, it is known to connect a host computer to one disc recording/ reproducing system (1 to 1 or 1:1 system) as shown in FIG. 1 or to connect a host computer to an N-number of the disc recording/reproducing apparatus (1 to N or 1:N system) as shown in FIG. 2. With the 1:N system, a burn-in arrangement of a smaller scale suffices. However, in this case, complicated interfacing cabling is necessary for interconnecting the host computer and the plurality of disc recording/reproducing apparatus. For example, with the use of a small computer system interface (SCSI) for interfacing between the host computer and the disc recording/reproducing apparatus, the interfacing cable takes the form of a 50-core cable, which can be handled only with extremely laborsome operations.

Also, among burn-in test items, there are, for example, detection of defective blocks, arranging the defective blocks in spare blocks, counting the number of errors and calculating the error rate. Accordingly, it takes approximately twenty hours to perform each burn-in operation. Hence the weight of burn-in the production process is tremendous not only from the aspect of the operating time but also from the aspect of the equipment including the equipment investment or equipment space. The overall of a plant depends to a large extent on how many disc recording/reproducing apparatus can be put through a burn-in at one time with the existing equipment.

OBJECT AND SUMMARY OF THE INVENTION

It is therefore an object of the present invention to provide a disc recording/reproducing apparatus whereby burn-in may be executed efficiently without necessitating a host computer or interface cabling.

It is another object of the present invention to provide a disc recording/reproducing apparatus whereby burn-in may be executed with a low equipment investment and in a relatively small equipment space for reducing production costs.

In accordance with the present invention, there is provided a disc recording/reproducing apparatus comprising storage means for storing of a self-diagnostic burn-in program, self-diagnostic program executing means for executing the self-diagnostic program stored in said storage means, and a memory for storing the results of execution of the self-diagnostic program by said self-diagnostic program executing means.

The disc recording/reproducing apparatus according to the present invention executes the burn-in for itself by executing the self-diagnostic program and storing the results of execution of the program in the memory. In more detail, the burn-in program is stored in the disc recording/reproducing apparatus itself and executed automatically on triggering, such as by turning-on of the power source, so that the burn-in of the disc recording/reproducing apparatus may be executed efficiently without necessitating a host computer or an interfacing cable. As a result, the burn-in of the disc recording/reproducing apparatus may be realized with a low equipment investment and in a small equipment space to render it possible to reduce costs incurred in the production process.

DETAILED DESCRIPTION OF PREFERRED EMBODIMENT

Figure 1:
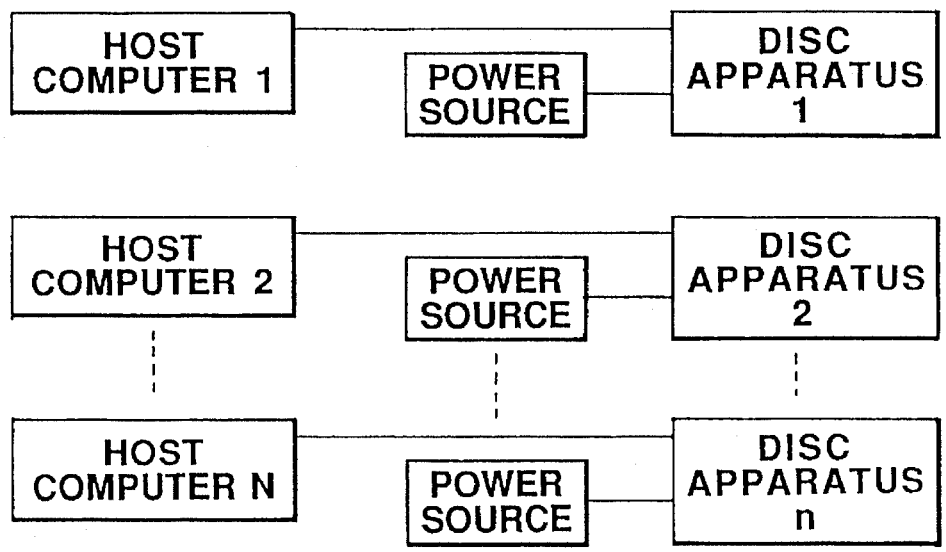
FIG. 1 shows the construction of a conventional one to one (1:1) burn-in system.
Figure 2:
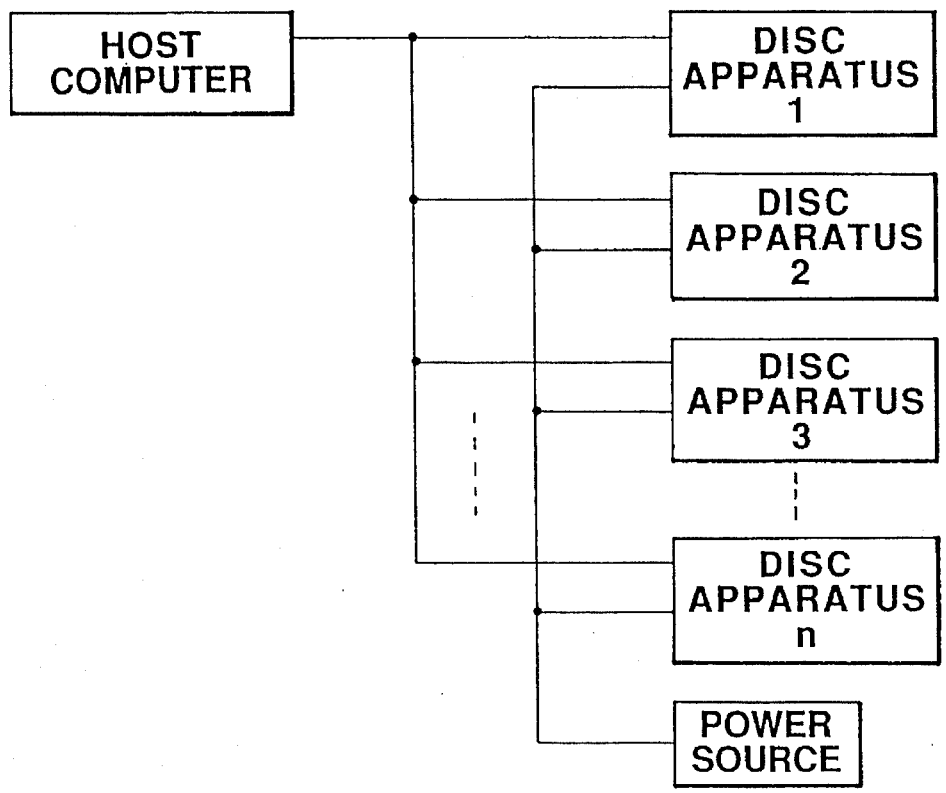
FIG. 2 shows the construction of a conventional one to N(1:N) burn-in system.

Referring to the drawings, an embodiment of the disc recording/reproducing apparatus according to the present invention will be explained with reference to the drawings.

Figure 3:
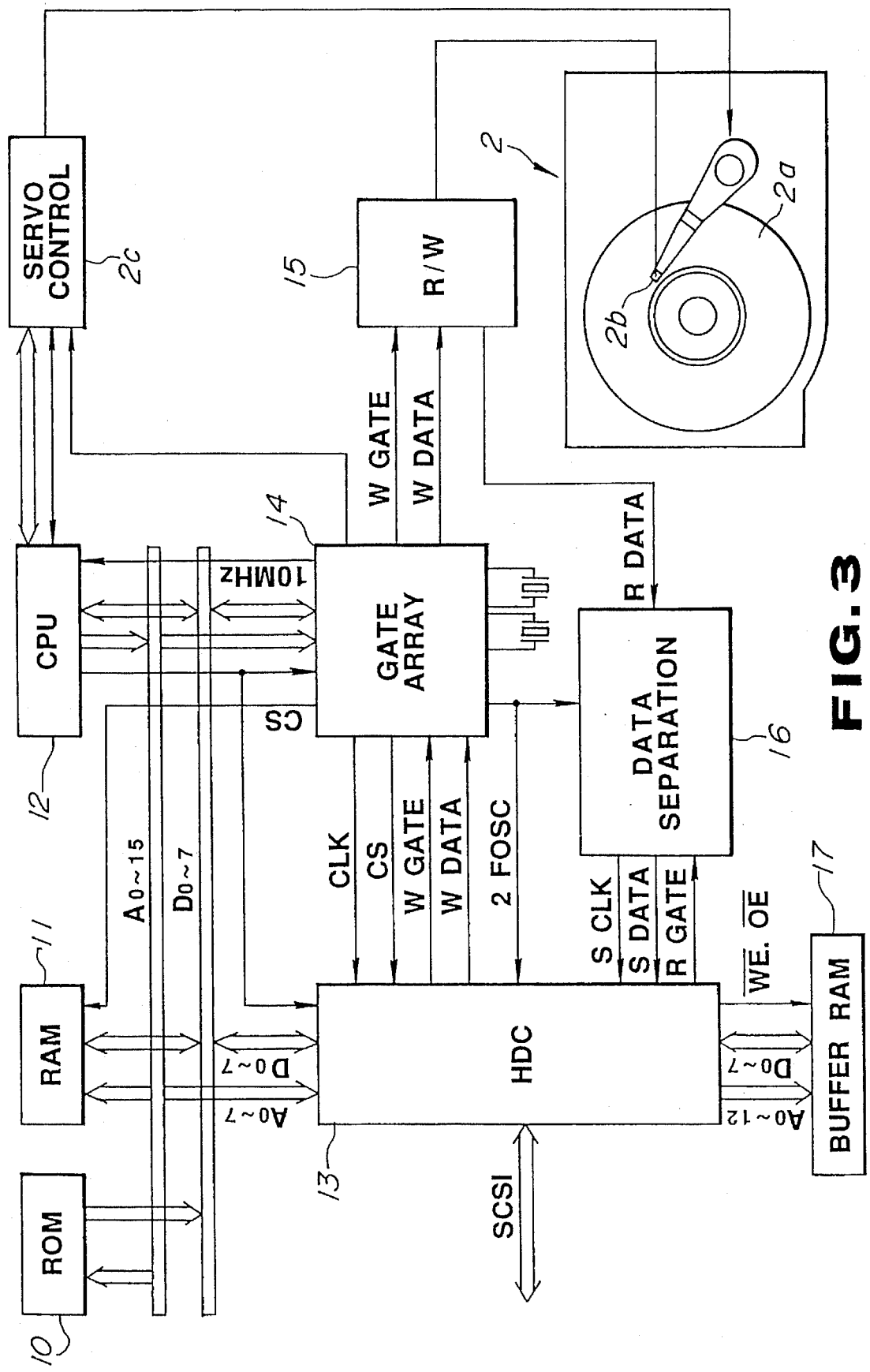
FIG. 3 is a block circuit diagram of a magnetic disc recording/reproducing apparatus to which the present invention is applied.

Referring to FIG. 3, which is a block circuit diagram of a magnetic disc recording/reproducing apparatus 1, the apparatus 1 is constituted by a disc drive 2 including a magnetic disc 2a, a magnetic head 2b for scanning the recording track on the magnetic disc 2a and a servo control circuit 2c for effecting tracking servo control of the magnetic head 2b, a read-only memory or ROM 10 in which a burn-in program and a control program for the magnetic disc recording/ reproducing apparatus, are stored, a central processing unit or CPU 12 for executing the burn-in program stored in ROM 10 or controlling the data recording/reproducing operation by the magnetic disc recording/reproducing apparatus 1, a random access memory or RAM 11 for transient storage of the results of the burn-in which has been executed, and a HDC circuit 13 for data interfacing with a host computer, a gate array circuit 14 for generating, clock signals for CPU 12, clock signals for interfacing with the host computer and clock signals for modulating data used for driving the magnetic head 2b, a read/write (R/W) circuit 15 for driving the magnetic head 2b using recorded data from gate array circuit 14 and for generating reproduced data from signals reproduced by the magnetic head 2b, a data separating circuit 16 for separating data from the reproduced data from the R/W circuit 15, and a buffer RAM 17 for transient storage of data separated by data separating circuit 16 and data from host computer and burn-in parameters recorded on a maintenance cylinder of the magnetic disc 2a, as will be explained subsequently.

Thus, with the present embodiment the ROM 10 is used as storage means for storage of a self-diagnostic program for burn-in, whereas the CPU 12 is used as means for executing the self-diagnostic program stored in ROM 10 and the RAM 11 is used as a memory for storing the results of execution of the self-diagnostic program by CPU 12.

The above described magnetic disc recording/reproducing apparatus 1 is connected to an electric power source and placed in a burn-in chamber wherein it is exposed to a predetermined temperature or subjected to a predetermined cycle of temperatures.

The burn-in of the magnetic disc recording/reproducing apparatus 1 is hereinafter explained by referring to the flow chart shown in FIG. 4.

A power source is turned on by the operator at step ST1. The CPU 12 then proceeds automatically to step ST2.

At step ST2, the CPU 12 reads out and analyzes, by means of the R/W circuit 15 data separating circuit 16 and HDC circuit 13, the parameters recorded on the maintenance cylinder of the magnetic disc 2a. These parameters indicate whether the operating mode is the normal mode for usual data recording/reproduction or the burn-in mode for executing the burn-in. If the result of the analyses indicates the normal mode, the CPU 12 proceeds to step ST 10 so that the magnetic recording/reproducing apparatus 1 is in the usual operating date. If the results indicate the burn-in mode, the CPU 12 proceeds to step ST 3.

At step ST 3, the CPU 12 analyzes if the parameters necessary for burn-in, such as, the time which elapses from power turn on until the start of various tests as later described, test time, test dwell time, number of test times, read/write method or the seek method, are previously recorded on the maintenance cylinder of the magnetic disc 2a or in an electrically erasable and programmable read only memory (EEPROM). If there are no such parameters, the CPU 12 proceeds to step ST 4 to set initially set default parameters as the burn-in parameter. If such parameters exist, they are read out and set, before the program proceeds to step ST 6.

At step ST 6, the CPU 12 executes the burn-in program stored in ROM 10, using the thus set parameters. For example, the CPU 12 executes a defect search test of detecting and rearranging defective blocks, and stores the results in RAM 11. In more detail, the CPU 12 repeatedly performs a write verifying operation, consisting of writing data for each of units of 1024 blocks on the overall surface of the magnetic disc 2a, reading out the written data and comparing the written data to the read-out data, and detects blocks in which at least one read/write error has occured. The above described sequence of the write verification operations is repeated 100 times on each of the detected blocks and, if at least one read/write error has been made in each of these blocks, the blocks are detected as the defective blocks. These defective blocks are rearranged in spare blocks, a defect search test consisting of performing the above mentioned sequence of write verification one hundred time on these rearranged defective blocks is executed, and the result is stored in RAM 11. On the other hand, the CPU 12 also counts the number of the errors, calculates the error rates and stores the results in RAM 11. In more detail, the CPU 12 performs the above mentioned write verification for each of units of 255 blocks or variable length blocks, on the overall surface of the magnetic disc 2a, while the magnetic head 2b is performing a seek operation over a long distance or a short distance of the disc, for detecting the blocks suffering from possible read/write errors. The above mentioned write verification operations are further repeated eleven times on these blocks and the errors are classified into a soft error in which the read/write errors disappear within ten consecutive verification operations, a hard error in which the read/write errors disappear at the eleventh verification operation, and an uncorrectable error. The number of errors is also counted by way of performing an error measurement and the results are stored in RAM 11. The number of the blocks suffering from errors, divided by the total number of the tested blocks, or the error rate, is then calculated, and the results are stored in RAM 11.

After execution of the above mentioned burn-in program, the CPU 12 proceeds to step ST 7 where the results of burn-in, which have been obtained during execution of the above mentioned burn-in program stored in RAM 11, that is the test data, are recorded on the maintenance cylinder of the magnetic disc 2a by means of the HDC circuit 13, data separating circuit 16, R/W circuit 15 and the magnetic head 2b. The CPU 12 then proceeds to step ST 8.

At step ST 8, the CPU 12 rewrites the parameters recorded on the maintenance cylinder of the magnetic disc 2a, so that the magnetic disc recording/reproducing apparatus 1 will automatically start the operation under the normal mode at the next power turn-on. The program then proceeds to step ST 9.

At step ST 9, the burn-in comes to a close. At the same time, a light emitting diode or LED indicating the operating state of the magnetic disc recording/reproducing apparatus 1 is caused to flicker at an on/off time interval apparently different from that for the normal operating state, so that the tester may discern if the state of operation of the magnetic disc apparatus 1 is or is not normal. The flickering of the LED is continued until the tester terminates such flickering.

Figure 5:
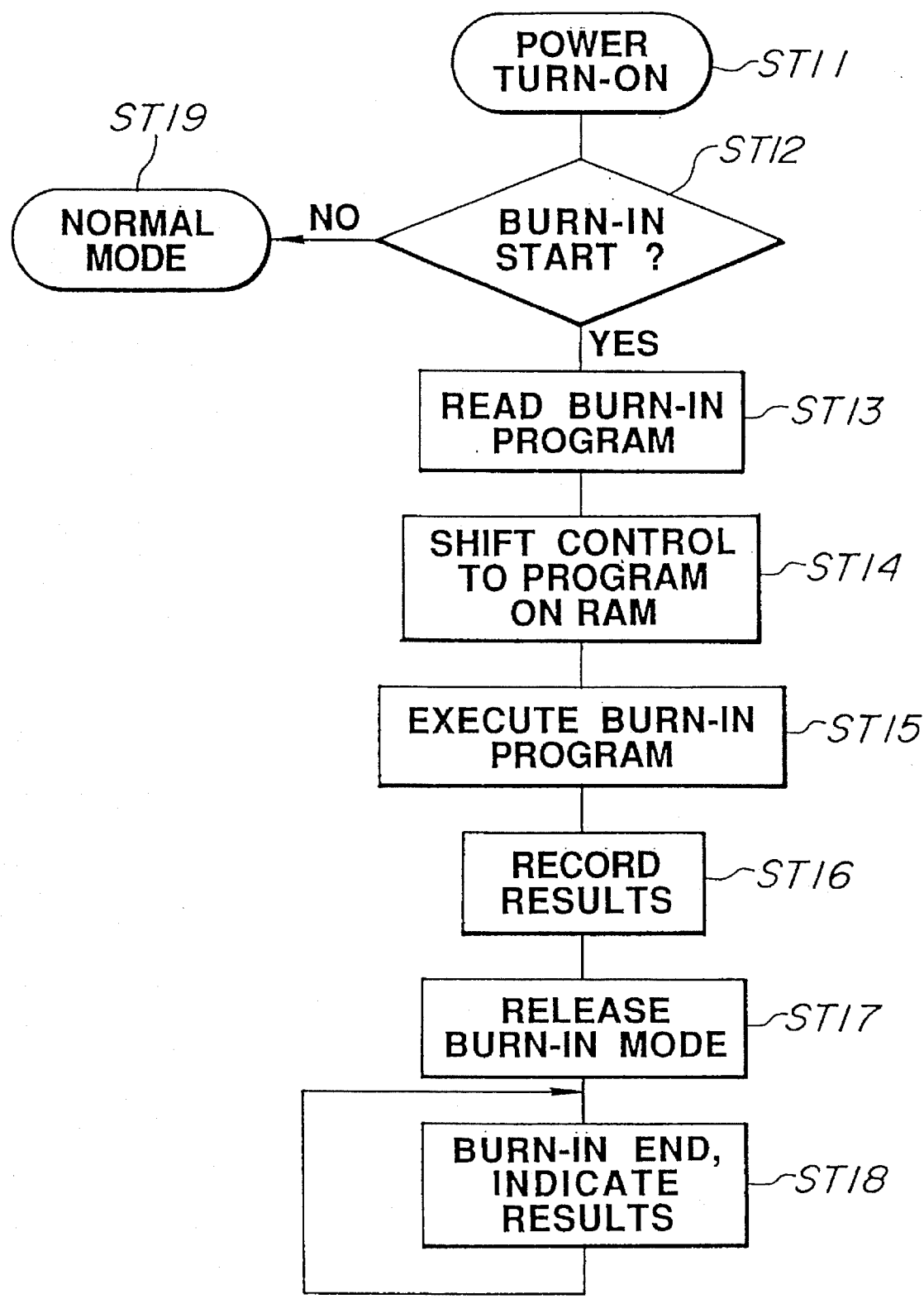
FIG. 5 is a flow chart for a burn-in in the case wherein the burn-in program is recorded on a magnetic disc.

In the above embodiment the burn-in program is stored in ROM 10. However, the burn-in program may also be recorded on the magnetic disc 2a and a so-called loader, which is a program adapted for reading the burn-in program, may be stored in ROM 10. That is, the flow chart shown in FIG. 5 may be executed. The burn-in of the magnetic disc recording/reproducing apparatus 1 is hereinafter explained by referring to the flow chart shown in FIG. 5.

At step ST 11, the power is turned on by the tester. The CPU 12 then automatically proceeds to step ST 12.

Figure 4:
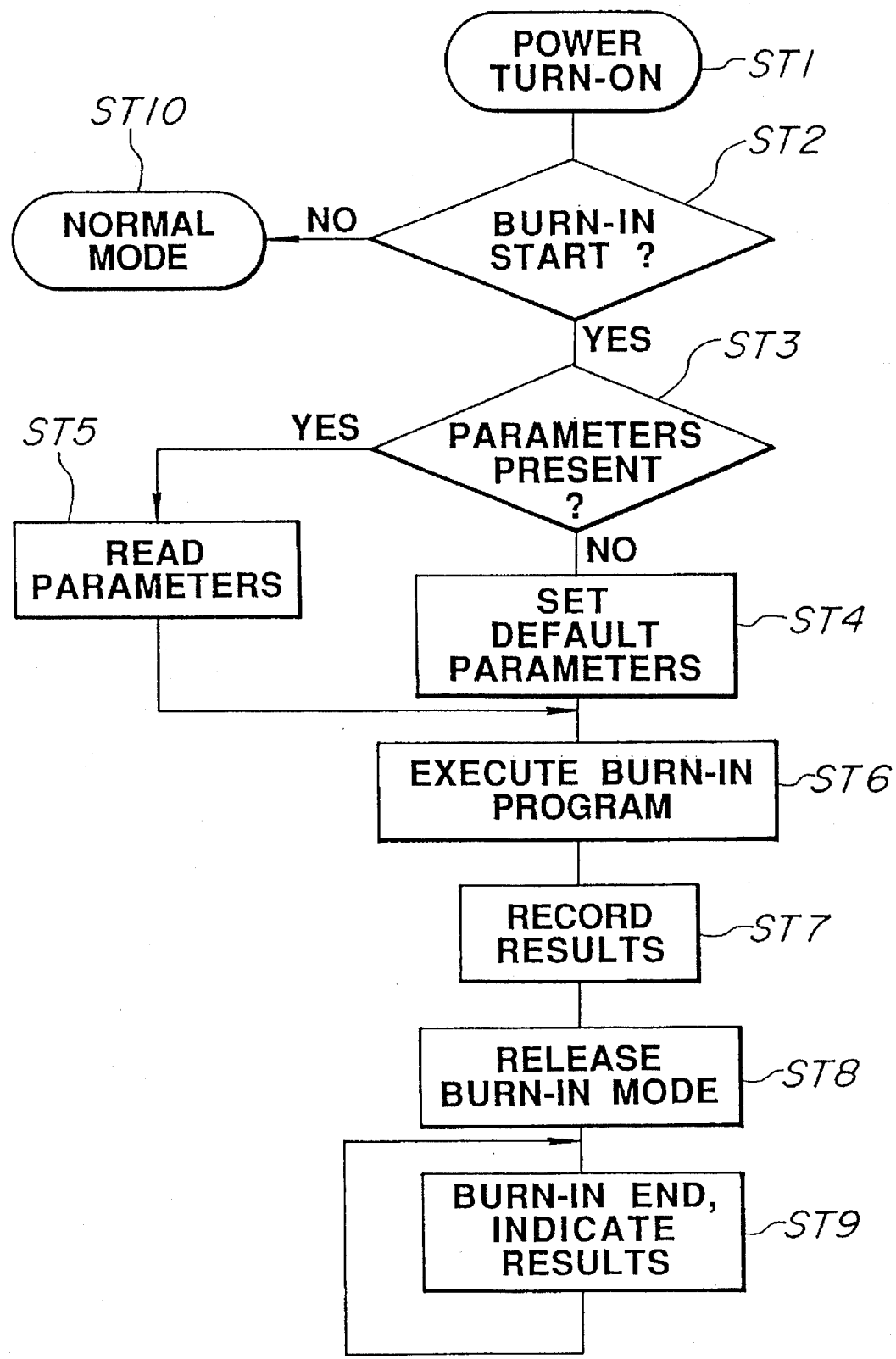
FIG. 4 is a flow chart for a burn-in in the case wherein the burn-in program is stored in a ROM.

At step ST 12, the CPU12 analyzes if the operating mode is the normal mode or the burn-in mode, as in the flow chart shown in FIG. 4. The CPU 12 then proceeds to step ST 13 or ST 19.

At step ST13, the CPU 12 reads out the burn-in program recorded on magnetic disc 2a to store the read-out burn-in program in RAM 11. The CPU 12 then proceeds to step ST 14.

At step ST 14, the CPU 12 shifts the control to the burn-in program stored in RAM 11, and then proceeds to step ST 15.

At step ST 15 the CPU 12 executes the burn-in program stored in RAM 11, as in step ST6 in FIG. 4. The CPU 12 then proceeds to step ST 16.

At step ST 16, the CPU 12 causes the result of burn-in to be recorded on the maintenance cylinder of the magnetic disc 2a, as in step ST 7 in FIG. 4, before the CPU 12 proceeds to step ST 17.

At step ST 17, the CPU 12 rewrites the parameters recorded on the maintenance cylinder of the magnetic disc 2a, so that the operation will be automatically started under the normal mode at the time of the next turn-on of the power source. The CPU 12 then proceeds to step ST 18.

At step ST 18, the burn-in comes to a close. The CPU 12 causes the LED to flicker as in step ST 9 shown in FIG. 4 to indicate to the tester if the operating state of the magnetic disc apparatus is or is not normal.

It will be understood from above that since the burn-in program is stored in ROM 10 or on magnetic disc 2a and automatically executed when the power source is turned on, the burn-in of the magnetic disc apparatus 1 may be executed efficiently without necessitating a host computer or interfacing cabling. In other words, equipment comprised of a burn-in chamber, a power source and a rack for mounting the magnetic disc recording/reproducing apparatus suffices, with correspondingly reduced equipment costs. The space required may also be saved because the host computer may be eliminated. Moreover, since the interfacing cables are not used, the equipment is resistant extraneous noises. There is also no necessity for modifying the equipment when the type of the magnetic disc recording/reproducing apparatus is changed. Since there is no connection between the host computer and the magnetic disc recording/reproducing apparatus or between one disc/reproducing apparatus and another, it becomes unnecessary, contrary to the conventional system, to take account of any influences on other magnetic disc recording/reproducing apparatus. An efficient burn-in may be achieved because a magnetic disc recording/reproducing apparatus where burn-in has come to a close may be exchanged at any time for another magnetic disc recording/reproducing apparatus where burn-in is to be commenced.

It is to be noted that the present invention is not limited to the above described embodiment but may comprise a number of modifications. For example, burn-in may be commenced by an outside input from, for example, a switch provided within the magnetic disc recording/reproducing apparatus, or a jig.

After the burn-in has come to a close, the results of the burn-in, recorded on the magnetic disc 2a, may be read into the host computer so as to be utilized later for such purposes as defect analyses for magnetic recording/reproducing apparatus.

The results of the burn-in may also be stored in the EEPROM provided in the magnetic disc recording/reproducing apparatus.

What is claimed is:

1. A disc driving apparatus comprising:

storage means for storage of a self-diagnostic program which is adapted for execution in a burn-in environment, said storage means being disposed within a housing which encloses said disc driving apparatus;

a first memory disposed within said housing for storing mode data representing a normal mode or a burn-in mode;

self-diagnostic program executing means for executing said self-diagnostic program stored in said storage means, said self-diagnostic program executing means being disposed within said housing;

control means for activating said self-diagnostic program executing means only when the mode data stored in said first memory represent, the burn-in mode, and for controlling said first memory to change the mode data stored in said first memory to represent the normal mode; and a second memory disposed in said housing for storing results of an execution of said self-diagnostic program from said self-diagnostic program executing means;

wherein said self-executing diagnostic program executing means executes said self-diagnostic program based on burn-in parameters which determine the operation of said self-diagnostic program; and wherein said burn-in parameters determine test time, test dwell time, a number of tests, and a read/write method.

2. A disc driving apparatus according to claim 1, wherein said burn-in parameters are stored in said first memory.

3. A disc driving apparatus according to claim 1, wherein said burn-in parameters are stored in an electrically erasable and programmable read only memory.

4. A disc driving apparatus according to claim 1, wherein said burn-in parameters comprise default parameters set by said self-diagnostic program executing means.

5. A disc driving apparatus according to claim 1, wherein said storage means comprises a read only memory.

6. A disc driving apparatus according to claim 1, wherein said first memory comprises a maintenance cylinder of a magnetic disc.

7. A disc driving apparatus according to claim 1, wherein said second memory comprises a random access memory.

8. A disc driving apparatus according to claim 1, wherein said first memory comprises a maintenance cylinder of a magnetic disc and said second memory comprises a random access memory, and wherein said control means copying said results stored in said second memory to said maintenance cylinder of said magnetic disc.

9. A disc driving apparatus according to claim 1, wherein upon completion of said self-diagnostic program, said control means changes said mode data to represent said normal mode.

10. A disc driving apparatus according to claim 1, wherein said storage means comprises a portion of a magnetic disc.

11. A disc driving apparatus according to claim 10, further comprising a read only memory which stores a loader program for reading said self-diagnostic program from said portion of said magnetic disc.

* * * * *